United States Patent
Shin et al.

[11] Patent Number: 5,458,830
[45] Date of Patent: Oct. 17, 1995

[54] METHOD AND APPARATUS OF MEASUREMENT OF ECCENTRICITY DIMENSION OF RIBBON-SHAPED BODY AND APPARATUS FOR CONTROL OF ECCENTRICITY DIMENSION

[75] Inventors: Kiyoshi Shin, Yotsukaido; Nobuharu Suzuki, Kisarazu; Takeyuki Kikuchi, Ichihara, all of Japan

[73] Assignee: The Furukawa Electric Co., Ltd., Tokyo, Japan

[21] Appl. No.: 182,353

[22] Filed: Jan. 18, 1994

[30]  Foreign Application Priority Data

Jan. 18, 1993 [JP] Japan .................................. 5-005811

[51] Int. Cl.⁶ .............................. G02B 6/44; G01M 11/00
[52] U.S. Cl. .................. 264/40.1; 73/150 R; 264/1.24; 264/285; 264/295; 264/339; 425/140; 425/141
[58] Field of Search .................. 264/40.1, 40.2, 264/40.7, 339, 285, 295, 1.24, 1.28, 1.29; 425/135, 140, 141; 73/150 R, 865.3

[56]  References Cited

U.S. PATENT DOCUMENTS 3,161,704  12/1964  Le Grand et al. .................. 264/40.1
3,504,395   4/1970  MacPherson ........................ 425/141
4,562,730   1/1986  Gowman ............................. 73/150 R
4,605,525   8/1986  Baxter ............................... 264/40.1
5,094,600   3/1992  Sikora ............................... 264/40.1

FOREIGN PATENT DOCUMENTS 57-110430  7/1982  Japan ................................. 264/40.1
59-94309   5/1984  Japan ................................. 264/40.1
3-253806  11/1991  Japan .

Primary Examiner—Mathieu D. Vargot

[57]  ABSTRACT

A method and apparatus for measurement of the eccentricity dimension which measures the eccentricity dimension $\alpha$ between optical fibers and a coating member of a fiber ribbon made up of optical fibers and a coating member having a rigidity relatively lower than the fibers and covering the outer surface of fibers. When taking up the fiber ribbon at a constant speed, the rotational speed $\omega_a$ of a first rotary drum made to contact one surface of the fiber ribbon and the rotational speed $\omega_b$ of a second rotary drum made to contact the other surface of the fiber ribbon are measured and the radii R of the rotary drums, the overall thickness t of the fiber ribbon, and the rotational speeds $\omega_a$ and $\omega_b$ of the rotary drums are substituted in the following equation to compute the eccentricity dimension $\alpha$:

$$\alpha = (\omega_b - \omega_a)(R + t/2) / (\omega_b + \omega_a)$$

11 Claims, 7 Drawing Sheets

METHOD AND APPARATUS OF MEASUREMENT OF ECCENTRICITY DIMENSION OF RIBBON-SHAPED BODY AND APPARATUS FOR CONTROL OF ECCENTRICITY DIMENSION

BACKGROUND OF THE INVENTION

1. Field of the Invention

The present invention relates to a method and apparatus for measurement of an eccentricity dimension which can measure the eccentricity dimension between, for example, fibers of a ribbon-shaped optical fiber comprised of a plurality of optical fibers covered with a coating member and a fiber ribbon. The present invention also relates to an apparatus for control of the eccentricity dimension which uses the method for measurement of the eccentricity dimension and feeds back the measured results so as to obtain a fiber ribbon uniformly covered with the coating member. The present invention further relates to a method and system for manufacturing a ribbon-shaped optical fiber having an even shape.

2. Description of the Related Art

Known in the art is a ribbon-type optical fiber (hereinafter referred to as a "fiber ribbon") comprised of a plurality of optical fibers arranged in a row or several layers and covered on their outside with a resin material or the like. This covering of the coating member is performed by supplying an uncured resin to a cavity formed inside a coating die while pulling the optical fibers orderly from a plurality of supply drums and passing them through the coating die. Prevention of deviation of the center positions of the optical fibers and fiber ribbon (hereinafter referred to as the "eccentricity" or the "eccentricity dimension") is an important factor in manufacture.

For example, when removing the coating member to connect optical fibers by using a peeling tool, if the eccentricity dimension exists, the optical fibers can be damaged by the peeling tool.

In the part, the thickness t of the fiber ribbon 1 shown in FIGS. 1A and 1B was measured using for example a laser dimension meter, but the eccentricity dimension $\alpha$ had been measured by destructive testing, that is, by cutting the end of the fiber ribbon 1 manufactured and examining the cross-section by a microscope or the like.

If it were possible to measure the eccentricity dimension $\alpha$ in-line over the entire length of a long fiber ribbon 1 in its longitudinal direction, then, for example, the results of measurement could be sequentially fed back so as to adjust the manufacture and control the eccentricity dimension $\alpha$ to "0". As a result, it would be possible to manufacture a fiber ribbon 1 with a coating member 2 formed to a uniform thickness ($t_u=t_l$).

The conventional method of measurement of the eccentricity dimension explained above, however, was a destructive test method, so it was only possible to measure the eccentricity dimension $\alpha$ at the two ends of the fiber ribbon 1. Even if the eccentricity dimensions $\alpha$ of the two ends were within the range of required values, it could not be guaranteed that the center portion of the fiber ribbon 1 was being manufactured within the range of standard values.

Further, in the conventional method of measurement by destructive testing, in-line measurement was not possible and the results of measurement could only be obtained after the manufacture, so the quality of the product 1 was learned only after the fiber ribbon 1 finished being covered. Accordingly, when the eccentricity dimension $\alpha$ fell out of the range of required values, it was necessary to discard the entire long fiber ribbon 1 or take similar action.

Japanese Unexamined Patent Publication (Kokai) 3-253806 (JPP3-253806) discloses a method of inspecting an eccentricity dimension $\alpha$ of resin coating of a fiber ribbon, in which optical fibers coated with resin are bent reversely by two guide rollers, two tension forces at the guide rollers are detected, and the eccentricity dimension of the resin coating is detected on the basis of difference between the two forces. The method disclosed in JPP 3-253806 is an on-line and non-destructive test, and therefore, can overcome the above disadvantages in the destructive test.

However, JPP 3-253806 does not disclose an explicit algorithm and equations for calculating the eccentricity dimension and, thus, is merely an idea.

Further, the measurement of the tension forces in JPP 3-253806 is difficult and inaccurate, and thus correct detection of the eccentricity dimension can not be achieved.

SUMMARY OF THE INVENTION

An object of the present invention is to provide a method and apparatus (system) of non-destructive measurement of the eccentricity dimension of a ribbon-shaped body comprising a core member and a coating member which enables in-line measurement at a high accuracy.

Another object of the present invention is to provide a method and apparatus of control of a coating of a coating member to avoid the eccentricity dimension of the coating member, by applying the above method and apparatus of the eccentricity dimension measurement.

Still another object of the present invention is to provide a method and apparatus of production of a ribbon-shaped body comprising a core member and a coating member, without the eccentricity dimension of the coating member, by applying the above control method and control apparatus.

According to the present invention, there is provided a method of measuring an eccentricity dimension of a core member of a ribbon-shaped body, the ribbon-shaped body comprising the core member and a coating member which covers the outer surface of the core member and is relatively low in rigidity with respect to the core member, the method including the steps of:

(a) arranging the ribbon-shaped body between first and second rotary bodies, so one surface of the ribbon-shaped body contacts the first rotary body and the other surface of the ribbon-shaped body contacts the second rotary body;

(b) running the ribbon-shaped body through the first and second rotary bodies at a predetermined tension;

(c) detecting a first speed of the ribbon-shaped body contacting the first rotary body and a second speed of the ribbon-shaped body contacting the second rotary body; and (d) calculating the eccentricity dimension of the core member on the basis of the detected first and second speeds, radii of the first and second rotary bodies, and a thickness of the ribbon-shaped body.

Preferably, the first and second speeds of the ribbon-shaped body are measured by the rotational speeds of the rotary bodies.

Specifically, the eccentricity dimension calculation is performed by the following formula:

$$\frac{\omega_b R_B - \omega_a R_A + (\omega_b - \omega_a) \cdot \frac{t}{2}}{\omega_a + \omega_b}$$

where, $R_A$ is a radius of the first rotary body, $R_B$ is a radius of the second rotary body, $\omega_a$ is the first rotation speed, $\omega_b$ is the second rotation speed, and t is the thickness.

Preferably, the method further includes the step of detecting the thickness of the ribbon-shaped body.

Also, according to the present invention, there is provided an apparatus for measuring an eccentricity dimension.

When taking up a ribbon-shaped body comprised of a core member and a coating member covering the outer surface of the core member at a certain tension, the tension T applied to the core member is expressed by the following:

$$T = Sf \cdot Ef \cdot \epsilon f$$

where the Young's modulus of the core member is Ef, the sectional area is Sf, and the strain is εf. For the tension applied to the coating member as well, similarly $$T = Sc \cdot Ec \cdot \epsilon c$$

where the Young's modulus of the coating member is Ec, the sectional area is Sc, and the strain is εc.

Accordingly, when taking up the ribbon-shaped body with a certain tension, it may be said that the share of the tension is dominant at the portion where the product between the sectional area and the Young's modulus is greater. With a ribbon-shaped body having a core member with a relatively high rigidity, for example, a fiber ribbon, the center of load when taking this up while bending it is dominant at the high rigidity core member.

Based on this understanding, in the present invention, when taking up a ribbon-shaped body of the above structure at a constant speed v, the rotational speed $\omega_a$ of the first rotary body made to contact one surface of the ribbon-shaped body and the rotational speed $\omega_b$ of the second rotary body made to contact the other surface of the ribbon-shaped body are measured. At the same time, the overall thickness t of the ribbon-shaped body is measured.

If the eccentricity dimension between the core member and the coating member is α, then the center of load when taking up the ribbon while bending it becomes dominant at the high rigidity core member, so the speed v of the ribbon-shaped body at the contact surface with one rotary body having a radius R is expressed as $$v = \omega_a (R + t/2 + \alpha)$$

and the speed v of the ribbon-shaped body at the contact surface of the other rotary body having a radius R is expressed as $$v = \omega_b (R + t/2 - \alpha)$$

The take up speeds of the ribbon-shaped body are equal, so the above equation can be changed to:

$$\alpha = (\omega_b - \omega_a)(R + t/2)/(\omega_b + \omega_a) \quad (1)$$

Here, since the radius R is a constant value, if the thickness t, and the rotational speeds $\omega_a$ and $\omega_b$ are measured, the eccentricity dimension α can be computed based on equation (1).

Further, according to the present invention, there is provided an apparatus for controlling the position of a coating means for coating a coating member on a core member of a ribbon-shaped body, the ribbon-shaped body comprising the core member and a coating member which covers the outer surface of the core member and is relatively low in rigidity with respect to the core member, the apparatus comprising:

(a) first and second rotary bodies between which the ribbon-shaped body passes so one surface of the ribbon-shaped body contacts the first rotary body and the other surface of the ribbon-shaped body contacts the second rotary body;

(b) a running means for running the ribbon-shaped body through the first and second rotary bodies at a predetermined tension;

(c) a speed detection means for detecting a first speed and a second speed of the ribbon-shaped body;

(d) a computing means for calculating the eccentricity dimension of the core member or a ratio of the eccentricity dimension with respect to a thickness of the ribbon-shaped body, on the basis of the detected first and second speeds and radii of the first and second rotary bodies; and (e) a controlling means for controlling the position of the coating means by the calculated eccentricity dimension, to thereby position the core member at a center in the coating member.

Further, according to the present invention, there is provided an apparatus for producing a ribbon-shaped body comprising a core member and a coating member which covers the outer surface of the core member and is relatively low in rigidity with respect to the core member, the apparatus comprising:

(a) a means for supplying the core member;

(b) a coating means for coating the core member by the coating member;

(c) a coating material supplying means for supplying coating material to the coating means;

(d) first and second rotary bodies between which the ribbon-shaped body is passed so one surface of the ribbon-shaped body contacts the first rotary body and the other surface of the ribbon-shaped body contacts the second rotary body;

(e) a running means for running the ribbon-shaped body through the first and second rotary bodies at a predetermined tension;

(f) a speed detecting means for detecting a first speed and a second speed of the ribbon-shaped body;

(g) a computing means for calculating the eccentricity dimension of the core member, or a ratio of the eccentricity dimension with respect to a thickness of the ribbon-shaped body, on the basis of the detected first and second speeds, radii of the first and second rotary bodies, and the thickness of the ribbon-shaped body; and (h) a position controlling means for controlling a position of the coating means, to thereby position the core member at a center in the coating member.

According to the present invention, there is also provided a method of measuring an eccentricity dimension of a core member of a ribbon-shaped body, the ribbon-shaped body comprising a core member and a coating member which covers the outer surface of the core member and is relatively low in rigidity with respect to the core member, the method including the steps of:

(a) bending the ribbon-shaped body which is running;

(b) detecting a first speed or a second speed, the first speed being an inner surface running speed of an inner surface of the ribbon-shaped body at a portion which is bent, and the second speed being an outer surface running speed of an outer surface of the ribbon-shaped body at a portion which is bent; and (c) calculating the eccentricity dimension of the core member on the basis of the detected first speed or the detected second speed and a bending radius.

The method may further include the steps of detecting a third speed which is a running speed of the ribbon-shaped body at a portion apart from the bent portion. The eccentricity dimension is calculated on the basis of the detected first or second speed, the detected third speed, and the bending radius.

BRIEF DESCRIPTION OF THE DRAWINGS

The above object and features of the present invention will be more apparent from the following description of the preferred embodiments with reference to the accompanying drawings, wherein:

FIGS. 1A and 1B are cross-sectional views for explaining the state of eccentricity of a ribbon-type optical fiber, wherein FIG. 1A shows a normal state and FIG. 1B shows an eccentric state;

DESCRIPTION OF THE PREFERRED EMBODIMENTS

An embodiment of the present invention will be explained with reference to the drawings.

The following explanation refers to an embodiment wherein a plurality of optical fibers are laid in parallel as a ribbon-shaped body and covered integrally on their outer surfaces with a resin material to form a fiber ribbon.

Figure 1A:
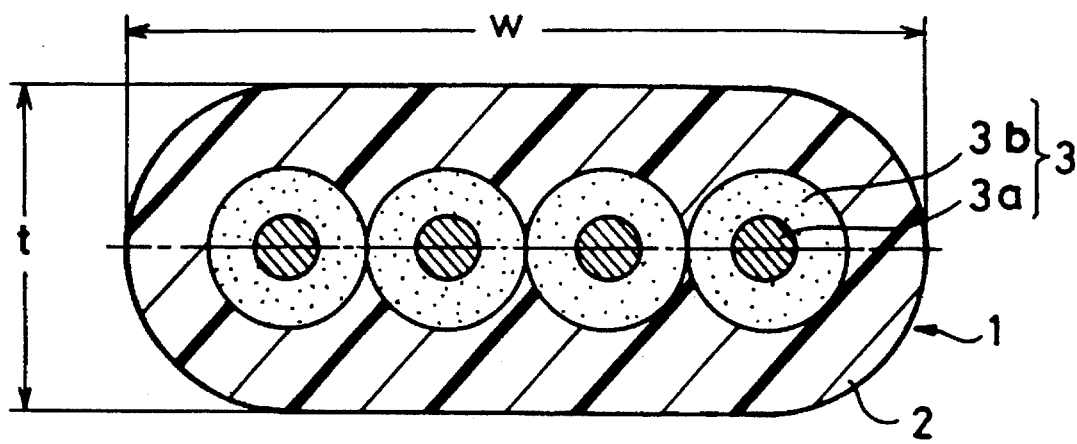

In FIG. 1A, the fiber ribbon 1 used for the measurement of the eccentricity dimension of the present embodiment is comprised of a plurality, for example, four optical fibers comprised of a core 3a made of glass and having a diameter of 10 μm and cladding 3b having a diameter of 125 μm arranged in parallel. The outer surfaces of the plurality of optical fibers 3 are covered with a coating member 2 comprised of for example a resin material so as to make them integral. The number of the optical fibers 3, the arrangement, and other conditions are not limited to those of this embodiment of course.

As mentioned later, however, the effect of the method of measurement of the present invention appears more remarkably when, between the rigidity (Young's modulus) of the optical fibers 3 made of glass and forming the core member and the rigidity (Young's modulus) of the coating member 2 made of resin, the rigidity of the optical fibers 3 is relatively greater.

Figure 2:
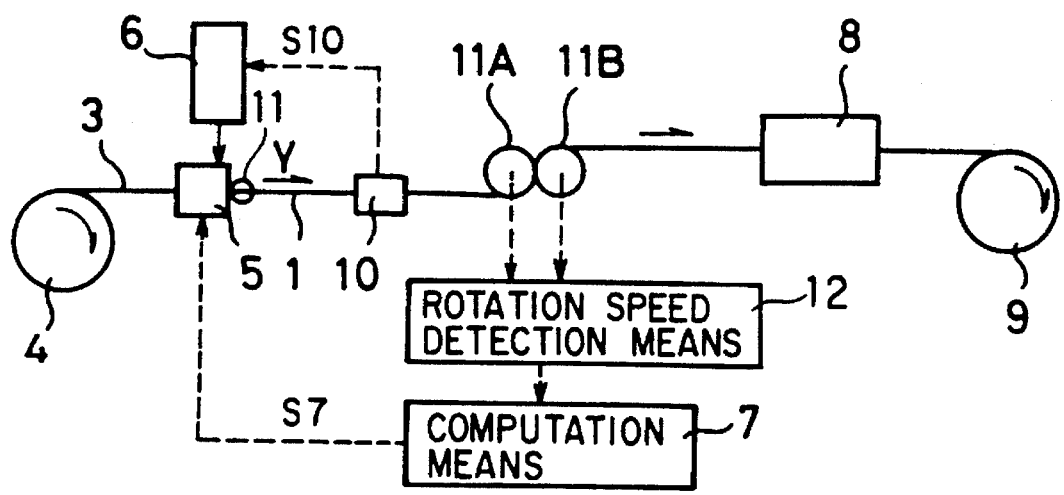
FIG. 2 is a block diagram of an apparatus for control of the eccentricity dimension of a ribbon-shaped body according to an embodiment of the present invention.

To cover the four optical fibers 3 shown in FIG. 1A integrally with the coating member 2, as shown in FIG. 2, the optical fibers 3 are pulled out in parallel from supply drums 4 on which the optical fibers 3 are wound. These optical fibers 3 are passed through a coating die 5. In the coating die 5 is formed a cavity corresponding to the sectional shape of the fiber ribbon 1. An uncured resin material is guided into the cavity from a resin supplier 6, whereupon a coating member 2 is continuously formed along the direction Y in which the optical fibers 3 are pulled out.

The relative positions of the coating die 5 and the optical fibers 3 are fixed adjustably by a positioner, not shown. The coating die 5, positioner, etc. together consititute the coating means of the present invention. When a correction signal S7 is input from a computation means 7, described later, to the positioner of the coating die 5, the positions of the optical fibers 3 with respect to the coating die 5 are corrected. By this, it is possible to adjust any eccentricity of the optical fibers 3 and fiber ribbon 1 during manufacture of the fiber ribbon 1.

The optical fibers 3 and the fiber ribbon 1 are pulled out by a pulling machine 8 shown in FIG. 2. After the optical fibers 3 pulled out from the supply drums 4 are passed through the coating die 5 to process them into the fiber ribbon 1, the ribbon is taken up on a take up drum 9.

At the downstream side of the coating die 5 of the present embodiment are provided a curing lamp 11 for emitting UV rays to cure the resin coated on the optical fibers 3, and a laser dimension meter 10 for measuring the overall thickness t, for example, 0.4 mm and width W, for example, 1.1 mm of the fiber ribbon 1 shown in FIG. 1A. The overall thickness t and width W measured by the laser dimension meter 10 are compared with ranges of standard values by the meter 10, then are fed back to the resin supplier 6.

For example, when either of the overall thickness t and width W is smaller than the standard values, a feedback signal S10 is output to increase the amount of the uncured resin supplied to the resin supplier 6. Conversely, when either of the overall thickness t and width W is larger than the standard value, the feedback signal S10 is output to reduce the amount of the resin supplied to the resin supplier 6. Due to this, it is possible to maintain the outer dimensions (overall thickness t and width W) of the fiber ribbon 1 to within a range of required values. Note that the means for measuring the outer dimensions t and W of the fiber ribbon 1 is not limited to the laser dimension meter, but a noncontact type dimension meter can be provided even directly under the outlet of the curing lamp 11, so it is possible to immediately feed back whether the outer dimensions t and W are good or not. This means is preferable in this sense.

Note that in the method of measurement of the eccentricity dimension and the apparatus for control of the eccentricity dimension of the present invention, it is sufficient to measure the overall thickness t of the fiber ribbon 1, so the feedback signal S10 to the resin supplier 6 may be omitted.

The outer dimensions t and W of the fiber ribbon 1 are controlled to be within ranges of required values by the laser dimension meter 10, but it is not possible to control the eccentricity dimension α between the optical fibers 3 and fiber ribbon 1.

Therefore, in this embodiment, provision is made of two rotary drums 11A and 11B (rotary bodies) downstream of the coating die 5 and the rotational speeds of the rotary drums 11A and 11B are detected.

Figure 3A:
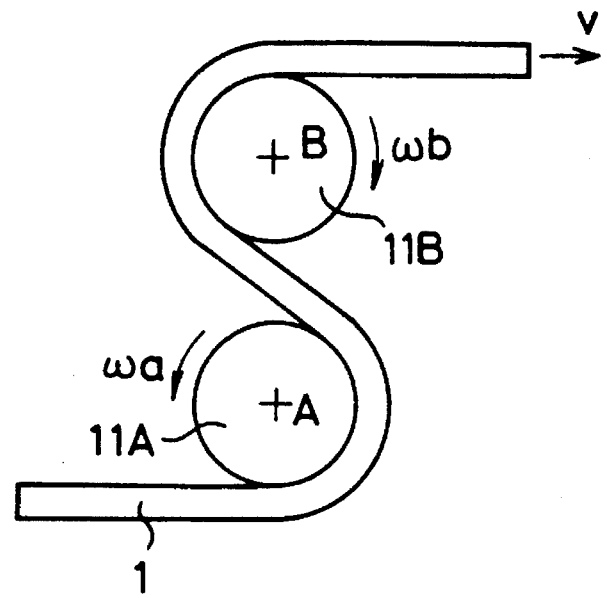
FIG. 3A is a side view showing a method for measurement of the eccentricity dimension of a ribbon-shaped body according to one embodiment of the present invention and FIG. 3B is a perspective view of the same.
Figure 3B:
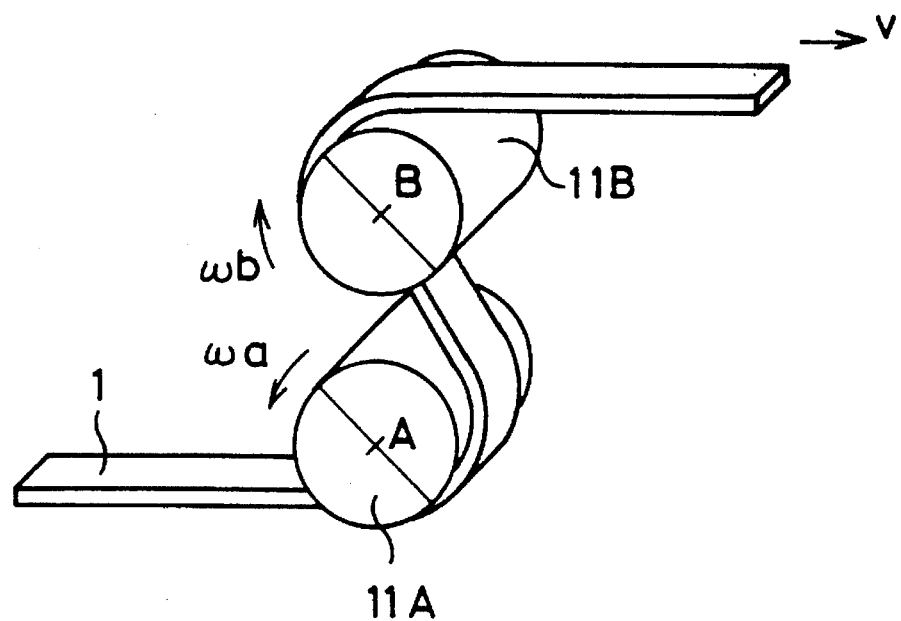

The rotary drums 11A and 11B, as shown in FIG. 2 and FIGS. 3A and 3B, are arranged so that the rotary drums 11A and 11B contact the front and back surfaces of the fiber ribbon 1 and can rotate freely as the fiber ribbon 1 is pulled out. That is, they are arranged so that if the rotary drum 11A comes into contact with one surface of the fiber ribbon 1, the rotary drum 11B comes into contact with the other surface of the fiber ribbon 1.

The rotational speeds of the rotary drums 11A and 11B, for example, the angular (rotation) speeds $\omega_a$ and $\omega_b$, are detected by a rotational speed detection means 12 provided at the rotary drums 11A and 11B. The angular speeds $\omega_a$ and $\omega_b$ are output to the computation means 7. The computation means 7 has input into it in advance the overall thickness t of the fiber ribbon 1 and the radii R of the rotary drums 11A and 11B. Computation is performed based on the computation equation (2) mentioned later from the above values and the values $\omega_a$ and $\omega_b$ of the angular speeds input from the rotational speed detection means 12, so as to find the eccentricity dimension α shown in FIG. 1B.

Further, the computation means 7 judges whether or not the eccentricity dimension α obtained as a result falls in the range of the required values input in advance. If outside of the range of required values, a correction signal S7 is output to the coating apparatus including the coating die 5 and the positioner so as to correct the relative position of the coating die 5 and the optical fibers 3.

Note that the construction of the rotary drum in the present invention is not limited to that shown in the above embodiment and can be modified in various ways. In the above embodiment, use is made of the two rotary drums 11A and 11B as the rotary bodies of the present invention, but it is also possible to construct the apparatus by a single rotary drum.

Next, the mode of operation will be explained.

When taking up a fiber ribbon 1 comprised of optical fibers 3 and a coating member 2 covering the optical fibers at a constant tension T, the tension T applied to the optical fibers 3 is expressed as follows when the Young's modulus of the optical fibers 3 is made Ef, the sectional area is made Sf, and the strain is made ef:

$$T = Sf \cdot Ef \cdot \epsilon f$$

Similarly, the tension T applied to the coating member 2 becomes as follows when the Young's modulus of the coating member 2 is made Ec, the sectional area is Sc, and the strain is ec:

$$T = Sc \cdot Ec \cdot \epsilon c$$

Therefore, when such a fiber ribbon 1 is taken up at a constant tension T, the portion with the larger product of the sectional area and the Young's modulus has the dominant share of the tension T.

Figure 1B:
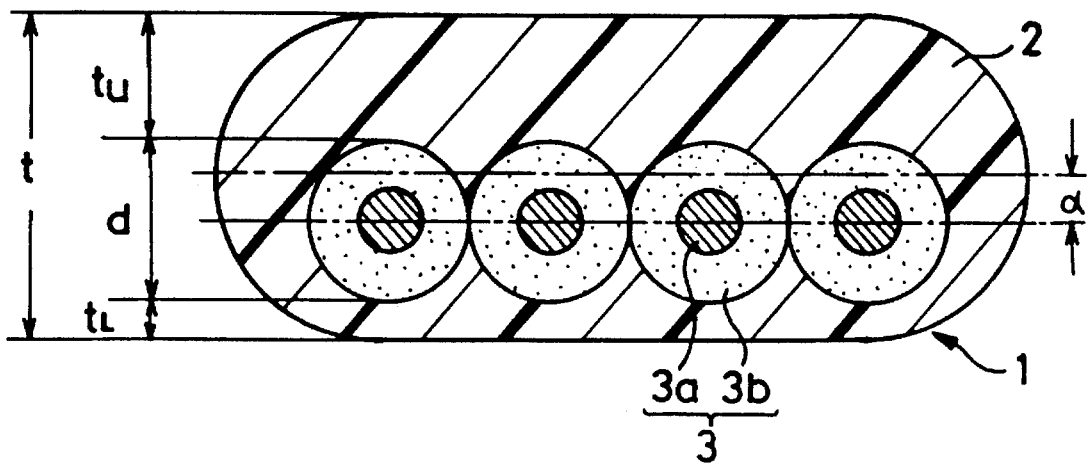

For example, if the Young's modulus of the optical fibers 3 is 21,000 kg/cm² and its diameter is 0.125 cm, the number of fibers is four, as shown in FIGS. 1A and 1B, the Young's modulus of the coating member 2 is 100 kg/cm², and the overall thickness of the fiber ribbon 1 is 0.4 cm, then $$Sf \cdot Ef = \pi(0.125/2)^2 \times 4 \times 21000 \approx 1030 \text{ kg}$$

$$Sc \cdot Ec = \{\pi(0.4/2)^2 - \pi(0.125/2)^2 + 0.4 \times 3 \times 0.125 - 3\pi (0.125/2)^2\} \times 100 \approx 555 \text{ kg}$$

and it will be understood that the optical fibers bear about twice the tension.

Accordingly, in a fiber ribbon 1 etc. having optical fibers 3 with a relatively high rigidity, the center of load when taking the ribbon up while bending it becomes dominant at the high rigidity optical fibers 3.

Note that even if the share of the tension of the optical fibers 3 is about the same as that of the coating member 2, the amount of eccentricity of the portion with the higher Young's modulus appears as a difference in rotation, so when the error is great, the error may be measured by experiments etc. and corrected.

Based on this understanding, when taking up the fiber ribbon 1 of the above construction at the constant speed v, the rotational speed $\omega_a$ of the rotary drum 11A made to contact one surface of the fiber ribbon 1 and the rotational speed $\omega_b$ of the rotary drum 11B made to contact the other surface of the fiber ribbon 1 are measured by the rotational speed sensor 12. At the same time, the radii R of the rotary drums 11A and 11B (in this embodiment, made the same radii for convenience) and the overall thickness t of the fiber ribbon 1 are input to the computation means 7.

Figure 4:
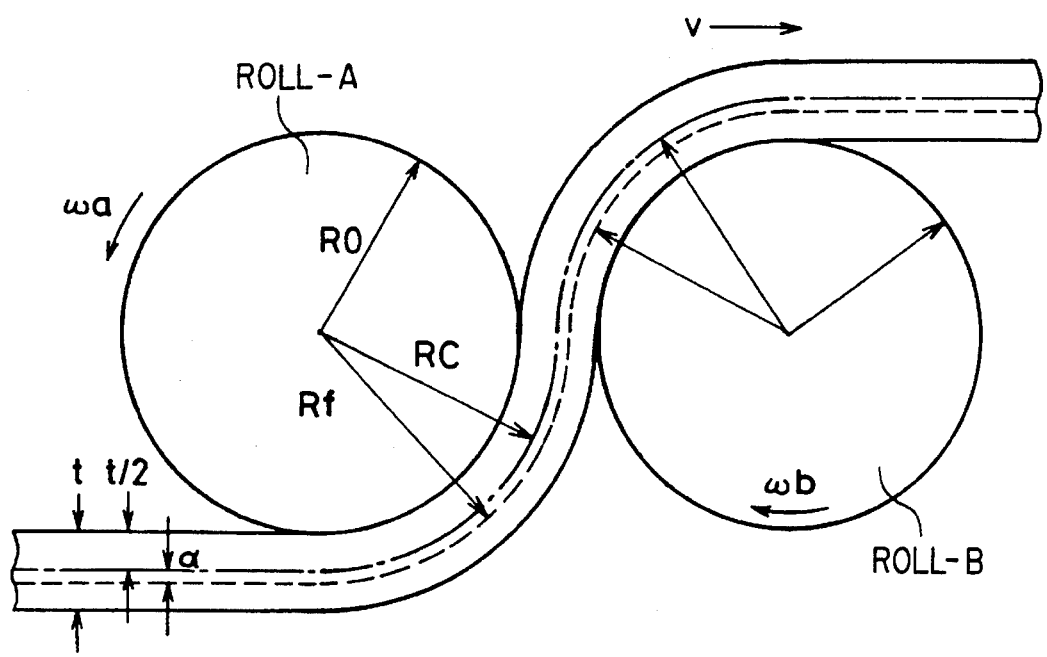
FIG. 4 is a side view for explaining the principle of the method of measurement of the eccentricity dimension of the present invention.

As shown in FIG. 1B, if the eccentricity dimension between the optical fibers 3 and coating member 3 is α, the center of load when taking up the ribbon while bending it becomes dominant in the optical fibers 3 with the high rigidity, so as shown in FIG. 4, the speed v of the fiber ribbon at the contact surface with one rotary drum 11A is expressed by $$v = \omega_a (R + t/2 + \alpha)$$

while the speed v of the fiber ribbon at the contact surface of the other rotary drum 11B is expressed by $$v = \omega_b (R + t/2 - \alpha)$$

Since the take up speeds v of the fiber ribbon 1 are equal, the above equation can be modified to $$\alpha = (\omega_b - \omega_a)(R + t/2)/(\omega_b + \omega_a) \qquad (2)$$

Here, R is a constant values, so if the measured values of t, $\omega_a$ and $\omega_b$ are found, then it is possible to compute the eccentricity dimension α based on equation (2). The computation means 7 which may include a microcomputer performs this computation.

The thickness t, per se, may be constant, if so, the eccentricity dimension α can be obtained without detecting the thickness. Alternatively, a ratio r of the eccentricity dimension α/t (or t/α) is effective to control the position of the coating die 5 so that the eccentricity dimension α is reduced.

$$r = \frac{\alpha}{t} = \frac{\omega_b - \omega_a}{\omega_b + \omega_a} \cdot \frac{R + t}{2t} \qquad (3)$$

These can be applied to other embodiments described later.

Note that when the radii $R_A$ and $R_B$ of the rotary drums 11A and 11B differ, $$v = \omega_a (R_A + t/2 + \alpha)$$

$$v = \omega_b(R_B + t/2 - \alpha)$$

so if the speed v is eliminated and α is found, then the computation may be performed by the following general equation:

$$\alpha = \frac{\omega_b R_B - \omega_a R_A + (\omega_b - \omega_a) \cdot \frac{t}{2}}{\omega_a + \omega_b} \quad (4)$$

Further, in the apparatus for control of the eccentricity dimension of the present embodiment, the eccentricity dimension α found from the above equation (2) or (4) or the ratio r defined by the equation (3) is found by measurement during the manufacture as shown in FIG. 2 and the results of measurement are fed back to the positioner of the coating apparatus. The coating member 2 is coated while sequentially adjusting the relative position between the optical fibers 3 and the coating member 2.

Figure 5:
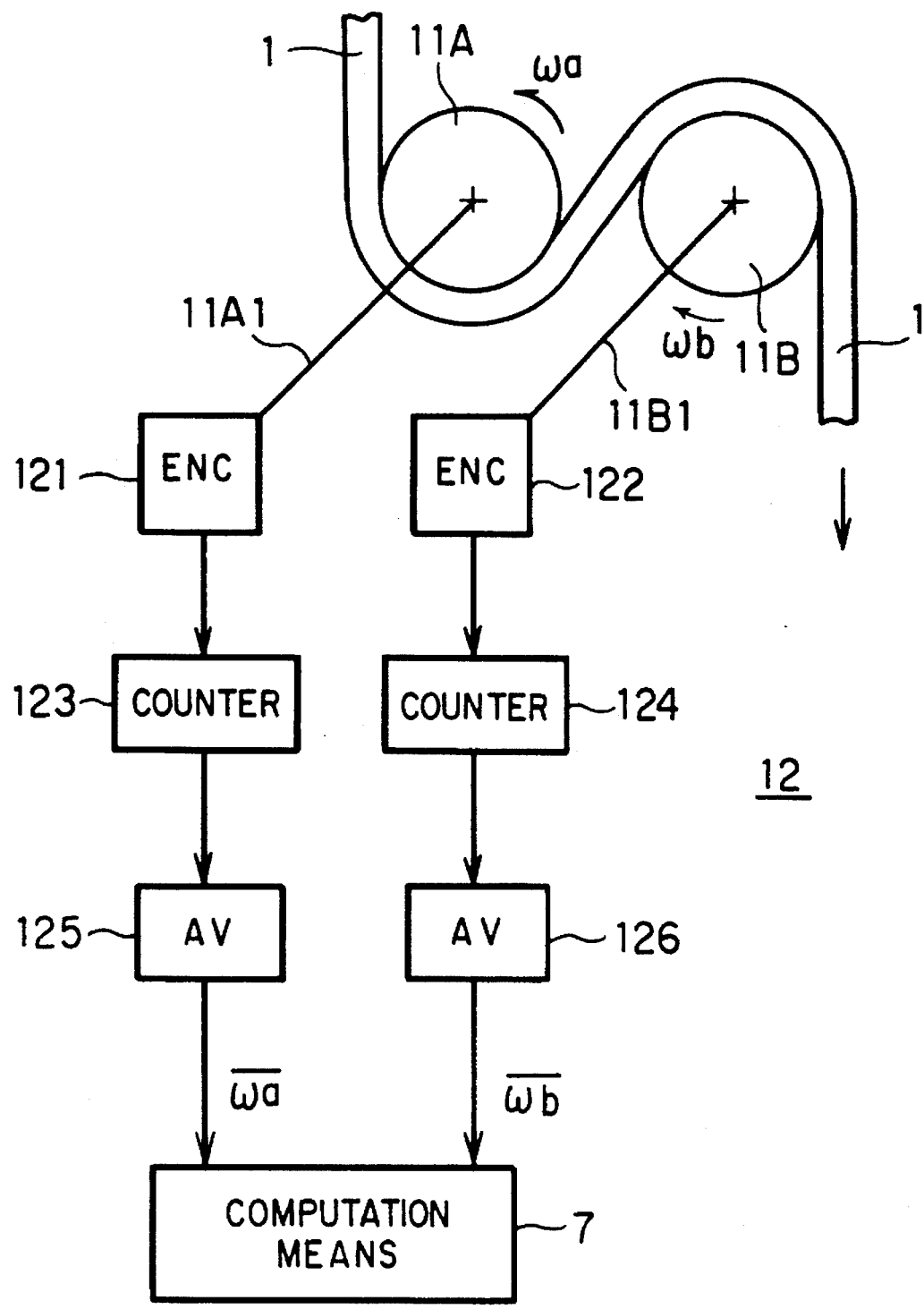
FIG. 5 is a view showing a specific configuration of a rotation speed detection means of FIG. 2.

FIG. 5 is a view showing a specific configuration of the rotational speed detection means 12 shown in FIG. 2. The rotational speed detection means 12 consists of a first rotary encoder 121 connected to a shaft 11A1 joined to the rotary drum 11A, a first counter 123 for counting a result of the first rotary encoder 121, and a first average calculator 125. The rotary encoder 121 encodes a precise rotation of the rotary drum 11A and the counter 123 counts the encoded pulses from the rotary encoder 121 in a predetermined period. As a result, the rotational speed $\omega_a$ is obtained. The average calculator 125 averages the rotational speed $\omega_a$ in a predetermined period, for example, 5 seconds.

The rotational speed detection means 12 also consists of a second rotary encoder 122 connected to a shaft 11B, a second counter 124, and a second average calculator 126 and provides an averaged rotation speed $\omega_b$. The computation means 7 reads the averaged rotational speeds $\omega_a$ and $\omega_b$ and uses them to calculate the eccentricity dimension.

Compared with the method disclosed in JPP 3-253806, accurate detection of the rotational speeds $\omega_a$ and $\omega_b$ is achieved, and therefore, the accurate calculation of the eccentricity dimension is obtained.

Figure 6:
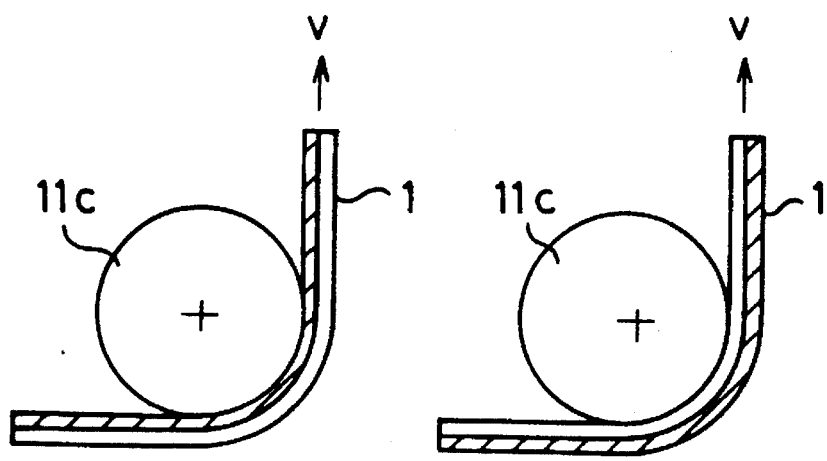
FIG. 6 is a side view showing the method of measurement of the eccentricity dimension of a ribbon-shaped body according to another embodiment of the present invention.
Figure 7:
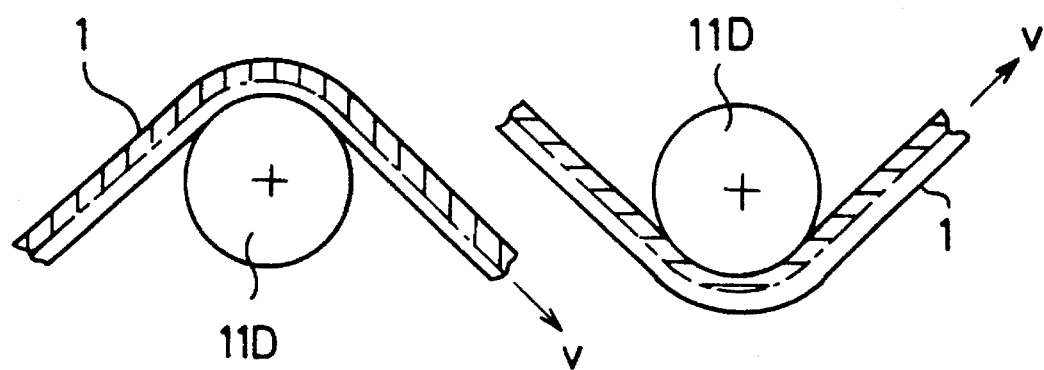
FIG. 7 is a side view of a method of measurement of an eccentricity dimension of a ribbon-shaped body according to still another embodiment of the present invention.

FIG. 6 is a side view showing the method of measurement of the eccentricity dimensions of a ribbon-shaped body according to another embodiment of the present invention, and FIG. 7 is a side view of the construction of a rotary drum according to still another embodiment of the present invention.

In the case of the rotary body shown in FIG. 6, use is made of a single rotary drum 11C. By turning around the fiber ribbon 1, the rotary drum 11C is made to contact one surface and then the other surface of the fiber ribbon 1. The rotational speeds of the same are detected. In this embodiment, it is true that the eccentricity dimension cannot be detected accurately at the same sectional surface of the fiber ribbon 1, but if the sectional precision of the fiber ribbon 1 is made constant for an adequate period by a positioner at the oulet of the coating die 5, for example 100 m length, it is possible to measure the eccentricity dimension α in the same way as the above-mentioned embodiment by reversing the ribbon for that period. Further, in this embodiment, since use is made of a single rotary drum 11C, there is the advantage that is is possible to set any radius R of the rotary drum.

Further, in the construction of the rotary body shown in FIG. 7, the rotary drum 11D is made to move between one surface and the other surface of the fiber ribbon 1 being taken up. In this case, too, the eccentricity dimension cannot be detected accurately at the same sectional surface of the fiber ribbon 1, but if the sectional precision of the fiber ribbon 1 is made constant by the positioner at the outlet of the coating die 5, it is possible to measure the eccentricity dimension α in the same way as the above-mentioned embodiment. Further, in this embodiment, since use is made of a single rotary drum 11C, there is the advantage that it is possible to set any radius R of the rotary drum.

The principle of measurement of the eccentricity dimension of the present invention will be described further with reference to FIG. 8.

Figure 8:
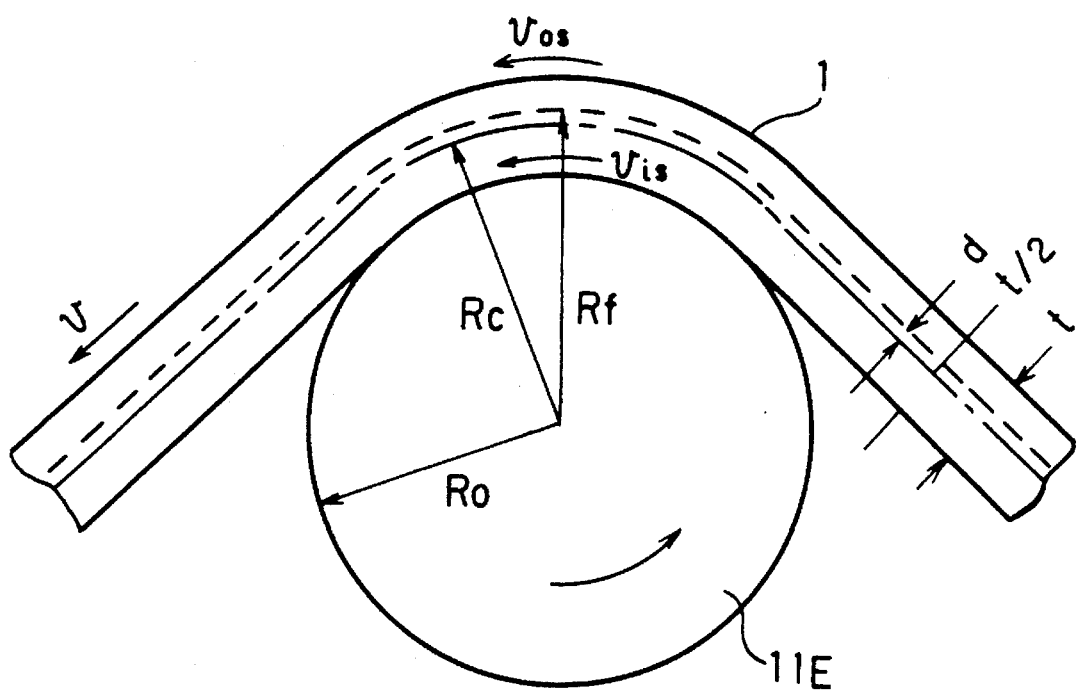
FIG. 8 is a side view of a method of measurement of an eccentricity dimension of a ribbon-shaped body according to yet another embodiment of the present invention.

Instead of the rotary drums 11A and 11B of FIG. 2, a single rotary drum 11E of FIG. 8 may be provided between the laser dimension meter 10 and the pulling machine 8. The fiber ribbon 1 is bent at the rotary drum 11E. When the fiber ribbon is bent, the inner surface speed $V_{is}$, which is the running speed of the inner surface of the fiber ribbon 1 which the rotary drum 11E directly contacts, and the outer surface speed $V_{os}$, which is the running speed of an outer surface opposite to the inner surface, are expressed by the following formulas:

$$V_{os} = V \frac{R_0 + t}{R_0 + t/2 + \alpha} \quad (5)$$

$$V_{is} = V \frac{R_0}{R_0 + t/2 + \alpha} \quad (6)$$

where,

V is a running speed of the fiber ribbon 1 for from the rotary drum 11E, $R_0$ is a radius of the rotary drum 11E, t is a thickness of the fiber ribbon 1, and α is the eccentricity dimension.

The running speed V is measured by, for example, a Doppler-effect type speed meter (not shown), or can be constant. The radius $R_0$ is constant. The thickness t is measured by the laser dimension meter 10, or can be constant.

In equation (5), when the outer surface speed $V_{os}$ is detected by, for example, a Doppler-effect speed meter, the eccentricity dimension α is obtained at the computation means 7 by the following equation:

$$\alpha = V/V_{os}(R_0 + t) - (R_0 + t/2) \quad (7)$$

Also, in equation (6), when the inner surface speed $V_{is}$ is detected by, for example, a rotary encoder (not shown) detecting a rotational speed of the rotary drum 11E, the eccentricity dimension α may also be obtained at the computation means 7.

$$\alpha = (V/V_{is} - 1)R_0 - t/2 \quad (8)$$

Further, in equations (5) and (6), when both the inner surface speed $V_{is}$ and the outer surface speed $V_{os}$ are detected, the eccentricity dimension α can be obtained without detecting the running speed V.

In this embodiment, the position control of the die 5 can be effected by the computation means 7.

From the embodiment of FIG. 8, it should be understood that, the rotary drums 11A and 11B function as a means for bending the fiber ribbon 1. Also, it should be understood that, in FIGS. 2 to 5, the rotational speeds of the rotary drums 11A and 11B are detected, but, more preferably, the speeds of the fiber ribbon 1 to which the rotary drums 11A and 11B are contacted, should be measured to improve the measurement and the calculation of the eccentricity α.

Note that the above embodiments were described for facilitating understanding of the present invention and were not described for limiting the present invention. Accordingly, the elements disclosed in the above embodiments include all design modifications and equivalents falling under the technical scope of the invention.

For example, the method and apparatus for measurement of the eccentricity dimension and the apparatus for control of the eccentricity dimension of the present invention can not only be applied to optical fibers, but can also be applied to flat belts comprised of parallel wires coated by a resin material to form a belt, flat cables, and the like. In addition, they may be applied to members having inside them materials having a difference in rigidity.

As mentioned above, according to the present invention, when taking up a ribbon-shaped body at a constant speed, the rotational speed of the rotary body made to contact one surface of the ribbon-shaped body and the rotational speed of the rotary body made to contact the other surface of the ribbon-shaped body are measured and the eccentricity dimension between the core material and coating material are computed from the radii of the two rotary bodies, the overall thickness of the ribbon-shaped body, and the rotational speeds of the rotary bodies, so it becomes possible to continuously measure the longitudinal direction of the ribbon-shaped body. Therefore, it becomes possible to correct the eccentricity in the longitudinal direction of the ribbon-shaped body, which had been impossible in conventional destructive testing.

Further, since in-line measurement becomes possible in the manufacturing process of a fiber ribbon or other ribbon-shaped body, it is possible to manufacture a ribbon-shaped body having a uniform thickness by feeding back the state of eccentricity. In addition to this, it is possible to automate the series of processes from the manufacture of the ribbon-shaped body to the measurement of the eccentricity dimension. Further, since the destructive work performed in conventional destructive testing also becomes unnecessary, it is possible to reduce the steps required for quality assurance.

Also, by using the method of measurement of the present invention for research to elucidate the various factors contributing to eccentricity, there is hope for further improvement of the quality of a ribbon-shaped body.

We claim:

1. A method of measuring an eccentricity dimension of a core member of a ribbon-shaped body, said ribbon-shaped body comprising said core member and a coating member which covers the outer surface of said core member and is relatively low in rigidity with respect to said core member, the method including the steps of:

arranging said ribbon-shaped body between first and second rotary bodies, so one surface of said ribbon-shaped body contacts said first rotary body and the other surface of said ribbon-shaped body contacts said second rotary body;

running said ribbon-shaped body through said first and second rotary bodies at a predetermined tension;

detecting a first speed of said ribbon-shaped body contacting said first rotary body and a second speed of said ribbon-shaped body contacting said second rotary body, said first and second speeds of said ribbon-shaped body being measured by rotational speeds of the rotary bodies; and calculating the eccentricity dimension of said core member on the basis of said detected first and second speeds, radii of said first and second rotary bodies, and a thickness of said ribbon-shaped body, said eccentricity dimension calculation being performed by the following formula:

$$\frac{\omega_b R_B - \omega_a R_A + (\omega_b - \omega_a) \cdot \frac{t}{2}}{\omega_a + \omega_b}$$

wherein, $R_A$ is a radius of said first rotary body,
$R_B$ is a radius of said second rotary body,
$\omega_a$ is said first rotation speed,
$\omega_b$ is said second rotation speed, and
t is said thickness.

2. An apparatus for measuring an eccentricity dimension of a core member of a ribbon-shaped body, said ribbon-shaped body comprising said core member and a coating member which covers the outer surface of said core member and is relatively low in rigidity with respect to said core member, the apparatus comprising:

first and second rotary bodies between which is passed said ribbon-shaped body so one surface of said ribbon-shaped body contacts said first rotary body and the other surface of said ribbon-shaped body contacts said second rotary body;

a running means for running said ribbon-shaped body through said first and second rotary bodies at a predetermined tension;

a speed detecting means for detecting a first speed of said ribbon-shaped body and a second speed of said ribbon-shaped body, said speed detecting means including means for detecting a first and a second rotational speed of said first and second rotary bodies; and a computing means for calculating the eccentricity dimension of said core member on the basis of said detected first and second speeds, radii of said first and second rotary bodies, and a thickness of said ribbon-shaped body, said computing means including means for calculating said eccentricity dimension by the following formula:

$$\frac{\omega_b R_B - \omega_a R_A + (\omega_b - \omega_a) \cdot \frac{t}{2}}{\omega_a + \omega_b}$$

wherein, $R_A$ is a radius of said first rotary body,
$R_B$ is a radius of said second rotary body,
$\omega_a$ is said first rotational speed,
$\omega_b$ is said second rotational speed, and
t is said thickness.

3. A method of controlling the position of a coating means for coating a coating member on a core member of a ribbon-shaped body, said ribbon-shaped body comprising said core member and a coating member which covers the outer surface of said core member and is relatively low in rigidity with respect to the core member, the member including the steps of:

arranging said ribbon-shaped body between first and second rotary bodies so one surface of said ribbon-shaped body contacts said first rotary body and the other surface of said ribbon-shaped body contacts said second rotary body;

running said ribbon-shaped body through said first and second rotary bodies at a predetermined tension;

detecting a first speed of said ribbon-shaped body and a second speed of said ribbon-shaped body, said first and second speeds of the ribbon-shaped body being measured by first and second rotational speeds of said first and second rotary bodies;

calculating the eccentricity dimension of said core member, or a ratio of the eccentricity dimension with respect to a thickness of said ribbon-shaped body, on the basis of said detected first and second speeds, and radii of said first and second rotary bodies said eccentricity dimension calculation being performed by the following formula:

$$\frac{\omega_b R_B - \omega_a R_A + (\omega_b - \omega_a) \cdot \frac{t}{2}}{\omega_a + \omega_b}$$

where,
$R_A$ is a radius of said first rotary body,
$R_B$ is a radius of said second rotary body,
$\omega_a$ is said first rotational speed,
$\omega_b$ is said second rotational speed, and
t is said thickness; and controlling the position of said coating means by said calculated eccentricity dimension, to thereby position said core member at a center in said coating member.

4. A method according to claim 3, further including the step of controlling an amount of coating material on the basis of said thickness.

5. An apparatus for controlling the position of a coating means for coating a coating member on a core member of a ribbon-shaped body, said ribbon-shaped body comprising the core member and a coating member which covers the outer surface of said core member and is relatively low in rigidity with respect to said core member, the apparatus comprising:

first and second rotary bodies between which said ribbon-shaped body passes so one surface of said ribbon-shaped body contacts said first rotary body and the other surface of said ribbon-shaped body contacts said second rotary body;

a running means for running said ribbon-shaped body through said first and second rotary bodies at a predetermined tension;

a speed detection means for detecting a first speed and a second speed of said ribbon-shaped body, said speed detecting means including means for detecting a first and a second rotational speed of said first and second rotary bodies;

a computing means for calculating the eccentricity dimension of said core member or a ratio of the eccentricity dimension with respect to a thickness of said ribbon-shaped body, on the basis of said detected first and second speeds and radii of said first and second rotary bodies, said computing means including means for calculating said eccentricity dimension by the following formula:

$$\frac{\omega_b R_B - \omega_a R_A + (\omega_b - \omega_a) \cdot \frac{t}{2}}{\omega_a + \omega_b}$$

where,
$R_A$ is a radius of said first rotary body,
$R_B$ is a radius of said second rotary body,
$\omega_a$ is said first rotational speed,
$\omega_b$ is said second rotational speed, and
t is said thickness; and a controlling means for controlling the position of said coating means by said calculated eccentricity dimension, to thereby position said core member at a center in said coating member.

6. An apparatus according to claim 5, further comprising a second controlling means for controlling an amount of coating material on the basis of said thickness.

7. An apparatus for producing a ribbon-shaped body comprising a core member and a coating member which covers the outer surface of said core member and is relatively low in rigidity with respect to said core member, the apparatus comprising:

a means for supplying said core member;

a coating means for coating said core member by said coating member;

a coating material supplying means for supplying coating material to said coating means;

first and second rotary bodies between which said ribbon-shaped body is passed so one surface of said ribbon-shaped body contacts said first rotary body and the other surface of said ribbon-shaped body contacts said second rotary body;

a running means for running said ribbon-shaped body through said first and second rotary bodies at a predetermined tension;

a speed detecting means for detecting a first speed and a second speed of said second ribbon-shaped body, said speed detecting means including means for detecting a first and a second rotational speed of said first and second rotary bodies;

a computing means for calculating the eccentricity dimension of said core member, or a ratio of the eccentricity dimension with respect to a thickness of said ribbon-shaped body, on the basis of said detected first and second speeds, radii of said first and second rotary bodies, and said thickness of said ribbon-shaped body, said computing means including means for calculating said eccentricity dimension by the following formula:

$$\frac{\omega_b R_B - \omega_a R_A + (\omega_b - \omega_a) \cdot \frac{t}{2}}{\omega_a + \omega_b}$$

where,
$R_A$ is a radius of said first rotary body,
$R_B$ is a radius of said second rotary body,
$\omega_a$ is said first rotational speed,
$\omega_b$ is said second rotational speed, and
t is said thickness; and a position controlling means for controlling a position of said coating means, to thereby position said core member at a center in said coating member.

8. An apparatus according to claim 7, further comprising a second controlling means for controlling an amount of coating material on the basis of said thickness.

9. A method of measuring an eccentricity dimension of a core member of a ribbon-shaped body, said ribbon-shaped body comprising a core member and a coating member which covers the outer surface of said core member and is relatively low in rigidity with respect to said core member, the method including the steps of:

bending said ribbon-shaped body which is running;

detecting a first speed or a second speed, said first speed being an inner surface running speed of an inner surface of said ribbon-shaped body at a portion which is bent, and said second speed being an outer surface running speed of an outer surface of said ribbon-shaped body at a portion which is bent;

detecting a third speed which is a running speed of said ribbon-shaped body at a portion apart from said bent portion; and calculating the eccentricity dimension of said core member on the basis of said detected first speed or said detected second speed, said detected third speed and a bending radius.

10. A method according to claim 9, further including the step of measuring a thickness of said ribbon-shaped body, wherein said eccentricity dimension is calculated on the basis of said first or second speed, said detected third speed, said measured thickness, and said bending radius.

11. A method of measuring an eccentricity dimension of a core member of a ribbon-shaped body, said ribbon-shaped body comprising a core member and a coating member which covers the outer surface of said core member and is relatively low in rigidity with respect to said core member, the method including the steps of:

bending said ribbon-shaped body which is running;

detecting a first speed and a second speed, said first speed being an inner surface running speed of an inner surface of said ribbon-shaped body at a portion which is bent; and said second speed being an outer surface running speed of an outer surface of said ribbon-shaped body at a portion which is bent;

detecting a third speed which is a running speed of said ribbon shaped body at a portion apart from said bent portion;

measuring a thickness of said ribbon-shaped body; and calculating the eccentricity dimension of said core member on the basis of said detected first speed, said detected second speed, said detected third speed, said measured thickness, and a bending radius.

* * * * *

UNITED STATES PATENT AND TRADEMARK OFFICE
CERTIFICATE OF CORRECTION

PATENT NO. : 5,458,830
DATED : October 17, 1995
INVENTOR(S) : Shin et al.

It is certified that error appears in the above-indentified patent and that said Letters Patent is hereby corrected as shown below:

Column 1, line 42, "part" should be --past--.

Column 8, line 1, "≈" should be --≑--.

Column 8, line 6, "≈" should be --≑--.

Column 9, line 42, "dimensions" should be --dimension--.

Column 9, line 61, "is" (first occurrence) should be --it--.

Column 9, line 65, after "case" delete ",".

Column 10, equation (7), "α=V/V$_{os}$(R$_0$+t)-(R$_0$+1/2)"

should be -- $\alpha = \dfrac{V}{V_{os}}(R_0+t)-(R_0+\dfrac{t}{2})$ --.

UNITED STATES PATENT AND TRADEMARK OFFICE
CERTIFICATE OF CORRECTION

PATENT NO. : 5,458,830
DATED : October 17, 1995
INVENTOR(S) : Shin et al.

It is certified that error appears in the above-indentified patent and that said Letters Patent is hereby corrected as shown below:

Column 10, equation (8), "$\alpha = V/V_{is} - 1) R_0 - t/2$"

should be -- $\alpha = \dfrac{V}{V_{is}} - 1) R_0 - \dfrac{t}{2}$ --.

Column 12, line 55, "member" (second occurrence) should be --method--.

Signed and Sealed this

Sixteenth Day of April, 1996

*Attest:*

BRUCE LEHMAN

*Attesting Officer*  *Commissioner of Patents and Trademarks*